United States Patent
Rastgar

(10) Patent No.: US 10,163,212 B2
(45) Date of Patent: Dec. 25, 2018

(54) VIDEO PROCESSING SYSTEM AND METHOD FOR DEFORMATION INSENSITIVE TRACKING OF OBJECTS IN A SEQUENCE OF IMAGE FRAMES

(71) Applicant: SONY CORPORATION, Tokyo (JP)

(72) Inventor: Houman Rastgar, Campbell, CA (US)

(73) Assignee: SONY CORPORATION, Tokyo (JP)

( * ) Notice: Subject to any disclaimer, the term of this patent is extended or adjusted under 35 U.S.C. 154(b) by 166 days.

(21) Appl. No.: 15/242,110

(22) Filed: Aug. 19, 2016

(65) Prior Publication Data

US 2018/0053294 A1    Feb. 22, 2018

(51) Int. Cl.
G06T 7/00 (2017.01)
G06K 9/46 (2006.01)
G06T 7/246 (2017.01)

(52) U.S. Cl.
CPC ............ G06T 7/004 (2013.01); G06K 9/4604 (2013.01); G06T 7/246 (2017.01); *G06T 2207/10016* (2013.01); *G06T 2207/10024* (2013.01)

(58) Field of Classification Search
CPC .......... G06T 7/004; G06T 2207/10016; G06K 9/4604
See application file for complete search history.

(56) References Cited

U.S. PATENT DOCUMENTS

| 2003/0128298 | A1* | 7/2003 | Moon | G06K 9/32 348/578 |
| 2007/0076922 | A1* | 4/2007 | Living | G06K 9/00295 382/118 |
| 2009/0290791 | A1 | 11/2009 | Holub et al. | |
| 2011/0122254 | A1* | 5/2011 | Ishii | G02B 27/646 348/169 |
| 2015/0055821 | A1 | 2/2015 | Fotland | |

(Continued)

OTHER PUBLICATIONS

Jae-Yeong Lee et al., "Visual tracking by partition-based histogram backprojection and maximum support criteria", 2011 IEEE International Conference on Robotics and Biomimetics (ROBIO), Dec. 7-11, 2011, pp. 2860-2865, ISBN: 978-1-4577-2136-6 , Karon Beach, Phuket.

(Continued)

*Primary Examiner* — Kim Y Vu
*Assistant Examiner* — Molly Delaney
(74) *Attorney, Agent, or Firm* — Chip Law Group

(57) ABSTRACT

Various aspects of a video processing system and method are provided for object tracking in a sequence of image frames are disclosed herein. The video processing system includes one or more circuits in an electronic device that acquires the sequence of image frames, which comprises at least a current image frame and a next image frame including an object. A distribution of first pixel values in a first image space associated with a first region, which corresponds to the object in the current image frame, is determined. Based on the distribution, the current image frame is transformed to a modified current image frame that includes at least a second region that corresponds to the first region and is associated with second pixel values in a second image space. Based on one or more features extracted as a template associated with the second region, the object is tracked in the next image frame.

18 Claims, 4 Drawing Sheets

(56) References Cited

U.S. PATENT DOCUMENTS

2015/0248775 A1* 9/2015 Freeman ............... G06T 11/001
345/589

OTHER PUBLICATIONS

Stanley T. Birchfield et al., "Spatial Histograms for Region-Based Tracking", ETRI Journal, Oct. 1, 2007, pp. 3, vol. 29, No. 5.
Stefan Duffner et al., "PixelTrack: a fast adaptive algorithm for tracking non-rigid objects", IEEE International Conference on Computer Vision, ISSN: 1550-5499, Dec. 1-8, 2013, pp. 8, Sydney, NSW.
Zhongpei Wang et al., "Robust object tracking via multi-scale patch based sparse coding histogram", Multimedia Tools and Applications, pp. 23, ISSN: 1380-7501, First Online Feb. 2, 2016.

* cited by examiner

VIDEO PROCESSING SYSTEM AND METHOD FOR DEFORMATION INSENSITIVE TRACKING OF OBJECTS IN A SEQUENCE OF IMAGE FRAMES

CROSS-REFERENCE TO RELATED APPLICATIONS/INCORPORATION BY REFERENCE

None.

FIELD

Various embodiments of the disclosure relate to a video processing system. More specifically, various embodiments of the disclosure relate to a video processing system and method for tracking deforming objects in a sequence of image frames.

BACKGROUND

Recent developments in the field of computer vision have led to advancement of various methods and techniques for visual tracking of objects by use of an imaging device, such as a camera. Currently, various techniques, either standalone or in combination, are utilized for tracking of such objects in video content. For example, template tracking technique may be utilized to track the objects, associated with rigid deformations, based on extraction of spatially sensitive features, such as histogram of oriented gradients (HOG). However, in cases where objects are associated with non-rigid deformations, the template tracking technique fails to capture or keep track of such objects, and hence provides inaccurate tracking results as the tracking gets drifted away from the original location of the objects.

In accordance with another example, histogram tracking technique utilizes a color histogram to represent the objects to be tracked. The color histogram represents spatially insensitive features and maintains the representation of the objects even if they are associated with deformations. However, the histogram tracking technique loses or discards substantial useful information, specifically, the spatial information, and hence provides inaccurate tracking results as the tracker gets drifted away to nearby regions with similar appearance.

In accordance with another example, a combination of the histogram tracking technique and the template tracking technique, in accordance with various approaches, may be utilized for tracking of the objects in the video content. In accordance with a first approach, the color histogram, generated by the histogram tracking technique, may be augmented with the spatial information that may be lost during the generation of a purely histogram based feature. Such spatial information may be augmented by the template tracking technique, however, being histogram-based, such technique remains computationally inefficient. In accordance with a second approach, patch-based histograms of the objects may be utilized to incorporate the lost spatial information. However, such approach is quite sensitive to the creation of patches in the object to be tracked and requires substantial memory for storage of multiple histograms. In accordance with a third approach, the histogram tracking technique may be fused with the template tracking technique to provide accurate tracking results. However, it may require both the tracking techniques to execute simultaneously and thus, may increase the computational complexity. Thus, an advanced, computationally efficient, and robust video processing system may be required for visual object tracking.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A video processing system and method are provided for deformation insensitive tracking of objects in a sequence of image frames substantially as shown in, and/or described in connection with, at least one of the figures, as set forth more completely in the claims.

These and other features and advantages of the present disclosure may be appreciated from a review of the following detailed description of the present disclosure, along with the accompanying figures, in which like reference numerals refer to like parts throughout.

DETAILED DESCRIPTION

Figure 1:
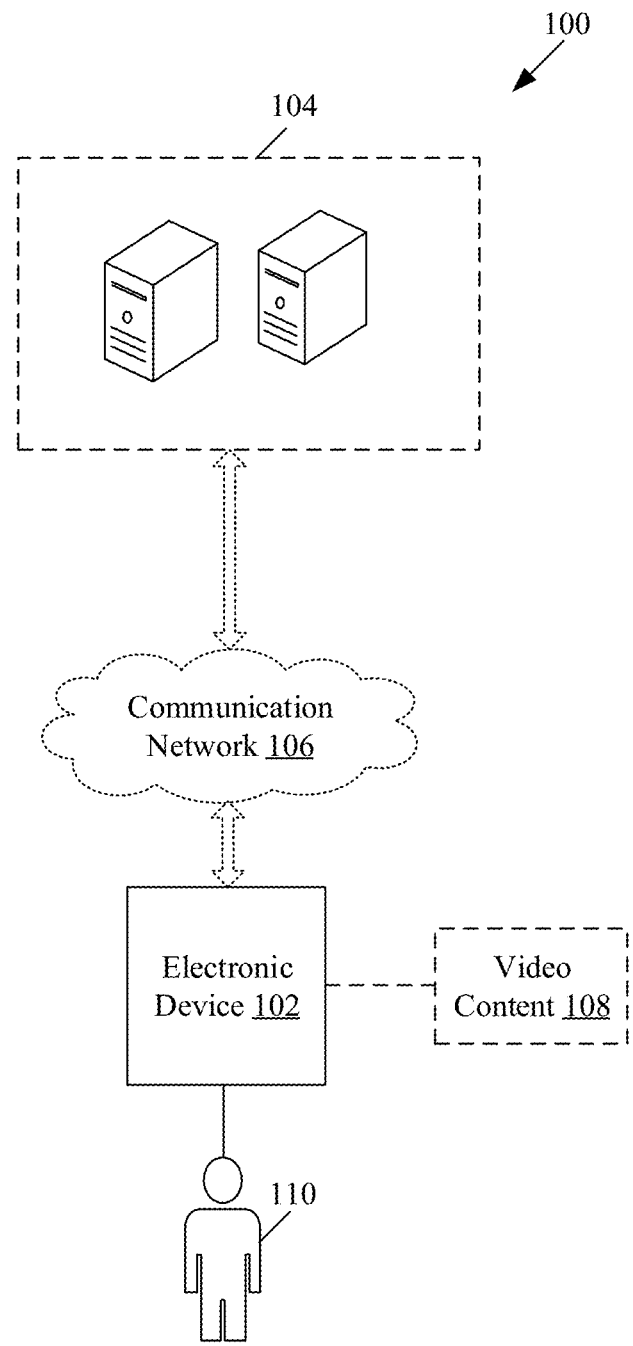
FIG. 1 is a block diagram that illustrates a network environment for deformation insensitive tracking of objects in a sequence of image frames, in accordance with an embodiment of the disclosure.

The following described implementations may be found in the disclosed video processing system and method for deformation insensitive tracking of object(s) in a sequence of image frames. Exemplary aspects of the disclosure may include a video processing method implemented in an electronic device that may include one or more circuits. The video processing method may include acquisition of a sequence of image frames of video content. The acquired sequence of image frames may comprise at least a current image frame and a next image frame. The acquired sequence of image frames that comprises the current image frame and the next image frame may further include at least one object. The video processing method may further include determination of a distribution of first pixel values in a first image space associated with a first region. The first region may correspond to the at least one object in the current image frame. The first pixel values may correspond to raw pixel values of a plurality of pixels in the first image space, such as a RGB color space, in the current image frame. The first pixel values of the first region may correspond to a tracking target. Based on the determined distribution, the video processing method may further include transformation of the current image frame to a modified current image frame. The modified current image frame may include at least a second region that may correspond to the first region and may be associated with second pixel values in a second image space. The second pixel values may correspond to likelihood values of the plurality of pixels in the modified current image frame. The first pixel values in the first image space, such as the RGB color space, are converted to a probability that they belong to a target object using the determined distribution. The probability may represent the second pixel values that may be also referred to as probability or likelihood values. Further, the video processing method may track the at least one object in a modified next image frame based on one or more features extracted as a template associated with the second region in the modified current image frame. In accordance with an embodiment, the one or more features may be associated with a spatial variance parameter that exceeds a specified first threshold value.

In accordance with an embodiment, the at least one object in the current image frame and the next image frame may be associated with one or more deformations. In accordance with an embodiment, the first image space may correspond to a color space and the second image space may correspond to a likelihood space.

In accordance with an embodiment, the transformation of the current image frame to the modified current image frame may include conversion of raw pixel values of a plurality of pixels in the current image frame to likelihood values of the plurality of pixels in the modified current image frame. In accordance with an embodiment, the determined distribution associated with the first region may indicate corresponding color histogram.

In accordance with an embodiment, the tracking of the at least one object in the modified next image frame may be based on a similarity score between the second region in the modified current image frame and a portion in the modified next image frame. The similarity score may exceed a specified second threshold value. In accordance with an embodiment, the one or more circuits may be configured to determine the similarity score based on the one or more features extracted as the desired target template.

FIG. 1 is a block diagram that illustrates a network environment for deformation insensitive tracking of objects in a sequence of image frames, in accordance with an embodiment of the disclosure. With reference to FIG. 1, there is shown an exemplary network environment 100. The exemplary network environment 100 may be also referred to as a network system. The exemplary network environment 100 may include an electronic device 102, one or more cloud resources, such as a server 104, and a communication network 106. There is further shown video content 108 and one or more users, such as a user 110. With reference to FIG. 1, the electronic device 102 may be communicatively coupled with the server 104, via the communication network 106. The electronic device 102, associated with the user 110, may be configured to capture and/or process the video content 108.

The electronic device 102 may comprise suitable logic, circuitry, interfaces, and/or code that may be configured to communicate with the server 104, via the communication network 106. The electronic device 102 may further include circuitry that may be configured to track one or more objects, such as deforming objects, in a sequence of image frames of video content, such as the video content 108. The deformation insensitive tracking of object(s) may refer to the ability of the electronic device 102 to also track deforming objects. Examples of the electronic device 102 may include, but are not limited to, an imaging device (such as a camera or a camcorder), an image- or video-processing device, a motion-capture system, and/or a projector device.

The server 104 may comprise a plurality of logic circuits, interfaces and/or code that may be configured to communicate with the electronic device 102, via the communication network 106. The server 104 may further include circuitry that may be configured to track one or more objects in video content, such as the video content 108. Examples of the server 104 may include, but are not limited to a web server, a database server, a file server, an application server, or a combination thereof. The server 104 may be implemented by use of several technologies that are well known to those skilled in the art.

The communication network 106 may include a medium through which the electronic device 102 and the server 104, may communicate with each other. The communication network 106 may be a wired or wireless communication network. Examples of the communication network 106 may include, but are not limited to, a Wireless Fidelity (Wi-Fi) network, a Local Area Network (LAN), a wireless personal area network (WPAN), a Wireless Local Area Network (WLAN), a wireless wide area network (WWAN), a cloud network, a Long Term Evolution (LTE) network, a plain old telephone service (POTS), a Metropolitan Area Network (MAN), and/or the Internet. Various devices in the exemplary network environment 100 may be configured to connect to the communication network 106, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, Long Term Evolution (LTE), Light Fidelity (Li-Fi), and/or other cellular communication protocols or Bluetooth (BT) communication protocols, including variants thereof.

The video content 108 may comprise a sequence of image frames. The sequence of image frames may comprise at least a current image frame and a next image frame, which includes at least one object, hereinafter referred to as a first object, to be tracked. Examples of the first object to be tracked may include, but are not limited to, a human subject, a group of people, an animal, an article, an item of inventory, a vehicle, and/or other such physical entity. Notwithstanding, the disclosure may not be so limited and any other living and/or non-living thing may be tracked without limitation to the scope of the disclosure. In accordance with an embodiment, the sequence of image frames of the video content 108 may be processed by the electronic device 102 to track the first object. In accordance with another embodiment, the sequence of image frames of the video content 108 may be processed by the server 104. In such a case, the electronic device 102 may transmit the video content 108 to the server 104, via the communication network 106. The server 104 processes the video content 108 and returns the tracked the first object back to the electronic device 102, via the communication network 106. Examples of the video content 108 may include, but are not limited to, a pre-recorded video clip, a live multimedia recording, or audio-visual digital content captured in real-time.

In operation, the electronic device 102 may be configured to acquire a sequence of image frames of the video content 108. In an instance, the acquired sequence of image frames of the video content 108 may be retrieved from local memory unit (not shown) of the electronic device 102. In another instance, the acquired the sequence of image frames of the video content 108 may correspond to multimedia content recorded in real-time by the electronic device 102. In yet another instance, the acquired sequence of image frames of the video content 108 may correspond to audio-visual digital content captured in real-time by the electronic device 102.

The acquired sequence of image frames may comprise at least a current image frame and a next image frame that includes an object, such as the first object. In accordance with an embodiment, the first object in the current image frame and the next image frame may be associated with one or more deformations that may vary with respect to time. In accordance with an embodiment, the current image frame may include a first region that corresponds to the first object and may be associated with the first pixel values in a first image space, such as RGB color space. The first region may correspond to the first object in the current image frame. The first pixel values may correspond to raw pixel values of a plurality of pixels in the first region of the current image frame.

The electronic device 102 may be configured to determine a distribution of the first pixel values, such as the raw pixel values, in the first image space associated with the first region. In accordance with an embodiment, the determined distribution, associated with the first region, may indicate a corresponding color histogram. The determination of the distribution of the first pixel values in the first region is explained in detail, for example, in FIG. 2. The first pixel values of the first region may correspond to a tracking target, such as the first object to be tracked.

The electronic device 102 may be further configured to transform the current image frame into a modified current image frame, based on the determined distribution. The modified current image frame may include at least a second region that corresponds to the first region and may be associated with second pixel values in a second image space, such as a likelihood space. For instance, in an event of transformation of the current image frame into the modified current image frame, the first pixel values in the first image space, such as the RGB color space, are converted to a probability that they belong to a target object in the modified current image frame using the determined distribution. The probability may represent the second pixel values that may be also referred to as probability or likelihood values. The target object may be a deforming object, such as the first object corresponding to the first region in the current image frame, which is to be tracked in the subsequent image frames of the acquired sequence of image frames. The likelihood space includes the likelihood values.

The electronic device 102 may be further configured to transform the next image frame into a modified next image frame. A portion in the modified image frame may correspond to the second region in the modified current image frame. The modified next image frame may be generated by the electronic device 102, based on a transformation of the next image frame, in a similar manner as described above with regards to the transformation of the current image frame. The electronic device 102 may be further configured to track the first object in the modified next image frame based on one or more features, extracted as the template, associated with the second region in the modified current image frame.

The electronic device 102 may be further configured to determine a similarity score between the second region in the modified current image frame and the portion in the modified next image frame. In accordance with an embodiment, the similarity score may be determined based on the one or more features, extracted as the template, associated with the portion in the modified next image frame and the one or more features associated with the second region in the modified current image frame. In accordance with an embodiment, the one or more features may be associated with a spatial variance parameter that may exceed a specified first threshold value.

The electronic device 102 may be further configured to track the first object in the modified next image frame in an event that the determined similarity score exceeds a specified second threshold value. The tracking of the first object in the modified next image frame may not be performed in an event that the determined similarity score is less than the specified second threshold value.

In accordance with another aspect of the disclosure, the electronic device 102 may be configured to transmit the acquired sequence of image frames to the server 104, via the communication network 106. The server 104 may be configured to determine the distribution of the first pixel values in the first image space associated with the first region that may correspond to the first object in the current image frame. The server 104 may be further configured to transform the current image frame to the modified current image frame based on the determined distribution. The modified current image frame may include at least the second region that corresponds to the first region and may be associated with the second pixel values in the second image space. The server 104 may be further configured to track the first object in the modified next image frame based on the one or more features extracted as the template that may be associated with the second region in the modified current image frame. The server 104 may be further configured to transmit the tracked first object to the electronic device 102, via the communication network 106.

Figure 2:
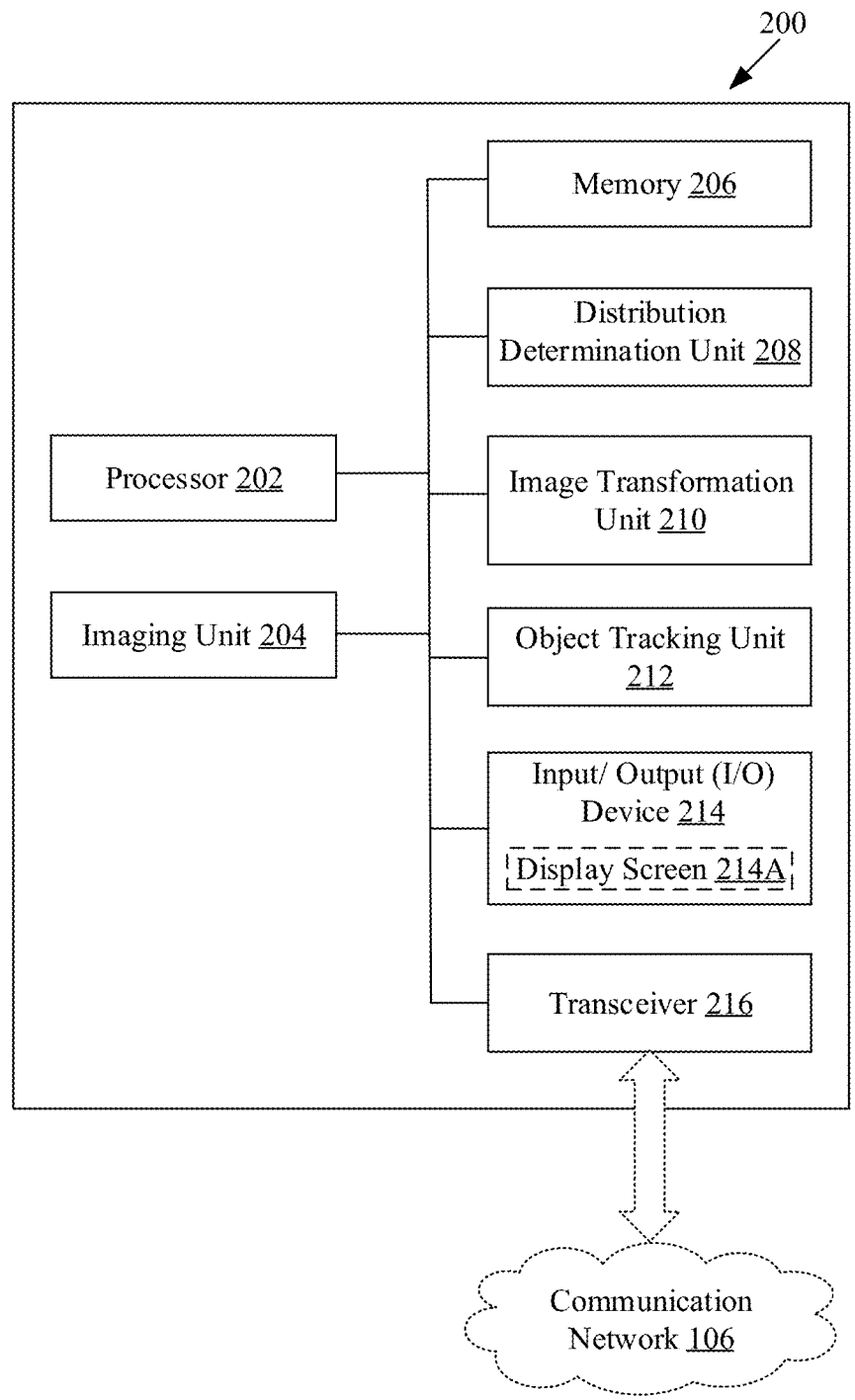
FIG. 2 is a block diagram of an exemplary video processing system for deformation insensitive tracking of objects in a sequence of image frames, in accordance with an embodiment of the disclosure.

FIG. 2 is a block diagram of a video processing system for deformation insensitive tracking of objects in a sequence of image frames, in accordance with an embodiment of the disclosure. FIG. 2 is described in conjunction with, for example, FIG. 1. With reference to FIG. 2, there is shown a block diagram 200 that may include one or more circuits configured for object tracking in the sequence of image frames. The one or more circuits may include a processor 202, an imaging unit 204, a memory unit 206, a distribution determination unit 208, an image transformation unit 210, an object tracking unit 212, one or more input/output (I/O) devices, such as an I/O device 214, and a transceiver 216. Further, the I/O device 214 may comprise a display screen 214A. There is further shown a communication network, such as the communication network 106 (FIG. 1).

As an exemplary embodiment, the block diagram 200 is shown to be implemented in an exemplary electronic device, such as the electronic device 102 (FIG. 1). However, in accordance with an embodiment, the block diagram 200 may be implemented in an exemplary server, such as the server 104 (FIG. 1), without deviation from the scope of the disclosure.

With reference to FIG. 2, the one or more circuits, such as the processor 202, the imaging unit 204, the memory unit 206, the distribution determination unit 208, the image transformation unit 210, the object tracking unit 212, the I/O device 214, and the transceiver 216 may be directly or indirectly coupled with each other. The output of the distribution determination unit 208 may be provided to the image transformation unit 210 in conjunction with the processor 202. The output of the image transformation unit 210 may be provided to the object tracking unit 212 in conjunction with the processor 202. Further, the output of the object tracking unit 212 may be provided to the I/O device 214. The transceiver 216 may be configured to communicate with the exemplary server, such as the server 104, via the communication network 106.

The processor 202 may comprise suitable logic, circuitry, interfaces, and/or code that may be operable to execute a set of instructions stored in the memory unit 206. The processor 202 may be further configured for object tracking in the sequence of image frames of video content, such as the video content 108 (FIG. 1), which may be acquired from a memory, such as the memory unit 206. The processor 202 may be implemented based on a number of electronic control unit technologies, which are known in the art. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

The imaging unit 204 may comprise suitable logic, circuitry, interfaces, and/or code that may be configured to capture the sequence of image frames of the video content, such as the video content 108. The sequence of image frames may include at least a current image frame and a next image frame. The imaging unit 204 may refer to a camera or an image sensor, which may be integrated within the electronic device 102. The imaging unit 204 may comprise a viewfinder that may be configured to compose and/or focus the view captured by the imaging unit 204. The imaging unit 204 may be configured to store the captured sequence of image frames of the video content in a local buffer and/or the memory, such as the memory unit 206.

The memory unit 206 may comprise suitable logic, circuitry, and/or interfaces that may be operable to store a machine code and/or a computer program with at least one code section executable by the processor 202. The memory unit 206 may be further operable to store the sequence of image frames that may further comprise one or more objects, such as the first object. The memory unit 206 may receive the sequence of image frames from the imaging unit 204. The memory unit 206 may be further operable to store operating systems and associated applications of the electronic device 102. Examples of implementation of the memory unit 206 may include, but are not limited to, Random Access Memory (RAM) including variants thereof, Read Only Memory (ROM), Hard Disk Drive (HDD), Flash memory, and/or a Secure Digital (SD) card.

The distribution determination unit 208 may comprise suitable logic, circuitry, code, and/or interfaces that may be configured to receive the sequence of image frames. The distribution determination unit 208 may be further configured to determine a distribution (such as histogram) of first pixel values in a first image space associated with a first region. The first region may correspond to the first object in the current image frame. The distribution determination unit 208 may be implemented as a separate processor or circuitry in the electronic device 102. The distribution determination unit 208 and the processor 202 may be implemented as an integrated processor or a cluster of processors that perform the functions of the distribution determination unit 208 and the processor 202. The distribution determination unit 208 may be implemented as a set of instructions stored in the memory unit 206, which on execution by the processor 202, may perform the functions and operations of the electronic device 102.

The image transformation unit 210 may comprise suitable logic, circuitry, code, and/or interfaces that may be configured to transform an image frame to a modified image frame. For example, the image transformation unit 210 may transform the current image frame to a modified current image frame. The image transformation unit 210 may further transform the next image frame to a modified next image frame. The image transformation unit 210 may be implemented as a separate processor or circuitry in the electronic device 102. The image transformation unit 210 and the processor 202 may be implemented as an integrated processor or a cluster of processors that perform the functions of the image transformation unit 210 and the processor 202. The image transformation unit 210 may be implemented as a set of instructions stored in the memory unit 206, which on execution by the processor 202 may perform the functions and operations of the electronic device 102.

The object tracking unit 212 may comprise suitable logic, circuitry, and/or interfaces that may be operable to track the first object in the modified current image frame. The object tracking unit 212 may be implemented as a separate processor or circuitry in the electronic device 102. The object tracking unit 212 and the processor 202 may be implemented as an integrated processor or a cluster of processors that perform the functions of the object tracking unit 212 and the processor 202. The object tracking unit 212 may be implemented as a set of instructions stored in the memory unit 206, which on execution by the processor 202 may perform the functions and operations of the electronic device 102.

The I/O device 214 may comprise suitable logic, circuitry, interfaces, and/or code that may be configured to control presentation of the tracked first object on a display screen 214A. The display screen 214A may be realized through several known technologies, such as, but are not limited to, Liquid Crystal Display (LCD) display, Light Emitting Diode (LED) display, and/or Organic LED (OLED) display technology. The I/O device 214 may comprise various input and output devices that may be configured to communicate with the processor 202. Examples of the input devices or input mechanisms may include, but are not limited to, a shutter button, a record button on the electronic device 102 (such as a camera), a software button on a UI of the electronic device 102, the imaging unit 204, a touch screen, a microphone, a motion and/or gesture sensor, and/or a light sensor. Examples of the output devices may include, but are not limited to, the display screen 214A, a projector screen, and/or a speaker.

The transceiver 216 may comprise suitable logic, circuitry, interfaces, and/or code that may be configured to communicate with one or more cloud resources, such as the server 104 (as shown in FIG. 1), via the communication network 106 (as shown in FIG. 1). The transceiver 216 may implement known technologies to support wired or wireless communication of the electronic device 102 with the communication network 106. Components of the transceiver 216 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

In operation, the processor 202 may be configured to acquire a sequence of image frames of the video content, such as the video content 108. In an instance, the acquired sequence of image frames of the video content may be retrieved from the memory unit 206 of the exemplary electronic device, such as the electronic device 102. In another instance, the acquired sequence of image frames of the video content may correspond to multimedia content recorded in real-time in the memory unit 206. In yet another instance, the acquired sequence of image frames of the video content may correspond to audio-visual digital content captured in real-time by the imaging unit 204. In such a case, the imaging unit 204 may be controlled based on an input signal received from a user, such as the user 110. The input signal may be provided by the user, via a selection of a graphical button rendered on the user interface (not shown) or a button-press event of a hardware button available at the electronic device 102.

The acquired sequence of image frames may comprise at least the current image frame and the next image frame that include the first object. In accordance with an embodiment, the first object in the current image frame and the next image frame may be associated with one or more deformations that may vary with respect to time. Such deformations may correspond to non-rigid deformations. In accordance with an embodiment, the current image frame may include a first region that corresponds to the first object and may be associated with first pixel values in a first image space, such as RGB color space. The first region may correspond to the first object in the current image frame of the acquired sequence of image frames. The first pixel values may correspond to raw pixel values of a plurality of pixels in the first region of the current image frame.

The distribution determination unit 208 in conjunction with the processor 202 may be configured to determine a distribution (or a histogram) of the first pixel values in the first image space associated with the first region. In accordance with an embodiment, the first image space may correspond to RGB color space, which is well known in the art. In accordance with an embodiment, the determined distribution, associated with the first region, may indicate a corresponding color histogram.

In an exemplary embodiment, the determined distribution may correspond to a feature (such as a color histogram) of an image patch. The image patch may correspond to a sub-region of the first region. The determined distribution, such as a histogram, for each image patch, may be represented by the following exemplary expression (1):

$$H_{I(X)}(b)=n_b \qquad (1)$$

where,
X corresponds to the pixel coordinates of the first region in the current image frame;
I(X) corresponds to pixel values of an image patch;
$H_{I(X)}(b)$ corresponds to the histogram;
b corresponds to the bin number and ranges from 1, 2, 3, . . . , B, where B corresponds to the total number of bins; and
$n_b$ corresponds to the number of pixels whose values fall within the b-th bin.

The determined distribution, $H_{I(X)}(b)$, may then be utilized to capture the number of occurrences of each pixel value in the range of the image patch, I(X), such that the determined distribution, $H_{I(X)}(b)$, may correspond to the number of pixels whose pixel values correspond the b-th bin after discretization. Discretization may correspond to transformation of continuous functions, models, and equations into discrete functions, models, and equations. In accordance with an embodiment, distribution determination unit 208 in conjunction with the processor 202 may be configured to determine a normalized histogram. The normalized histogram may correspond to a histogram in which the sum of all bins adds up to "1", as represented by the following exemplary expression (2):

$$H_{I(X)}(b)=p(I(X)) \qquad (2)$$

where
$H_{I(X)}(b)$ corresponds to the normalized histogram; and
p(I(X)) corresponds to the probability of a particular color value in the image patch, I(X).

In accordance with an embodiment, the determined distribution (or the histogram) may be associated with a spatial variance parameter that may be less than a specified first threshold value. The spatial variance parameter may correspond to spatial parameters that are insensitive to one or more deformations in the first object in the current image frame.

The image transformation unit 210 in conjunction with the processor 202 may be configured to receive the distribution determined by the distribution determination unit 208. The image transformation unit 210 may be further configured to transform the current image frame into a modified current image frame based on the determined distribution, as described above in expressions (1) and (2). The modified current image frame may include at least a second region that corresponds to the first region and may be associated with second pixel values in a second image space, such as a likelihood space. In other words, the likelihood space may also be referred to as a back projection space. The second pixel values may correspond to likelihood values of the plurality of pixels in the modified current image frame. The likelihood values may represent the probability values of the raw pixel values of the plurality of pixels that they belong to a target object in the modified current image frame. The probability may represent the second pixel values that may be also referred to as probability or likelihood values. The second region may be associated with one or more features. In accordance with an embodiment, the transformation of the current image frame to the modified current image frame may include conversion of raw pixel values of a plurality of pixels in the current image frame to likelihood values of the plurality of pixels in the modified current image frame. The above mentioned transformation of the current image frame to the modified current image frame may be represented by as the following exemplary expression (3):

$$BP(X)=H_{I(Object)}(I(X)) \qquad (3)$$

where,
BP(X) corresponds to the likelihood values of the plurality of pixels in the modified current image frame;
$H_{I(Object)}$ corresponds to the determined distribution, i.e. the histogram, of the object; and
I(X) corresponds to the pixel values of the image patch in the first object in the current image frame at location X.

In accordance with an embodiment, the object tracking unit 212 in conjunction with the processor 202 may be configured to extract one or more features, extracted as a template, associated with the second region in the modified current image frame. The next image frame may be processed in a similar manner as to that of the current image frame. A next modified image frame may be may be generated by the image transformation unit 210, based on a transformation of the next image frame, in a similar manner as described above in expressions (1), (2), and (3) with regards to the transformation of the current image frame. In accordance with an embodiment, the one or more features, extracted as the template, may be associated with the spatial variance parameter that may exceed the specified first threshold value. Such extracted one or more features may correspond to spatially sensitive features, such as histogram of oriented gradients (HOG). The object tracking unit 212 in conjunction with the processor 202 may be further configured to track the first object in the modified next image frame based on the one or more features, extracted as the template, associated with the second region in the modified current image frame.

In accordance with an embodiment, the object tracking unit 212 may be further configured to register the first object in the modified current image frame with the next instance of the first object in the modified next image frame. Such a registration may be achieved based on various difference metrics, such as sum of squared differences (SSD) or normalized cross correlation (NCC).

The object tracking unit 212 may be further configured to determine a similarity score between the second region in the modified current image frame and the portion in the modified next image frame. In accordance with an embodiment, the similarity score may be determined based on the one or more features, extracted as the template, associated with the second region in the modified current image frame and the one or more features associated with the portion in the modified next image frame. The tracking of the exemplary object, such as the first object, may be achieved by maximizing the similarity score between the second region in the modified current image frame and the portion in the modified next image frame. The maximization of the similarity score between the second region in the modified current image frame and the portion in the modified next image frame may be represented by the following exemplary expression (5):

$$X_{k+1} = \underset{X \in D}{\operatorname{argmax}} S(f(BP(X)) - T) \quad (5)$$

where, $X_{k+1}$ corresponds to location of the exemplary object (the first object in the modified next image frame);

S corresponds to the similarity score between the second region in the modified current image frame and the portion in the modified next image frame;

D corresponds to the search area in the modified next image frame;

BP(X) corresponds to the likelihood values of the plurality of pixels in the modified next image frame (back projection space or likelihood space);

f(BP(X)) corresponds to the one or more features associated with the likelihood values of the plurality of pixels in the modified next image frame; and T corresponds to the one or more features extracted as the template associated with the second region in the modified current image frame.

In accordance with an embodiment, the object tracking unit 212 may be further configured to track the first object in the modified next image frame in an event that the determined similarity score exceeds a specified second threshold value. In such a case, it may be considered that the tracking of the first object is accurate and the tracked location of the first object in the next image frame is correct. The tracking of the first object in the modified current image frame may not be performed by the object tracking unit 212 in an event that the determined similarity score is less than the specified second threshold value. Such an event may occur due to insufficient matching of the first object between the modified next image frame and the modified current image frame. In such a case, it may be considered that the tracking of the first object is inaccurate and the tracked location of the first object in the next image frame is incorrect.

In accordance with an embodiment, the display screen 214A included in the I/O device 214, in conjunction with the object tracking unit 212 and the processor 202 may be configured to display the tracked first object on the display screen 214A. In accordance with an embodiment, the memory unit 206 in conjunction with the processor 202 may be configured to store the tracked first object. In accordance with an embodiment, the transceiver 216 may be configured to transmit the tracked first object to one or more cloud resources, such as the server 104 (FIG. 1), via the communication network 106 (FIG. 1).

Figure 3:
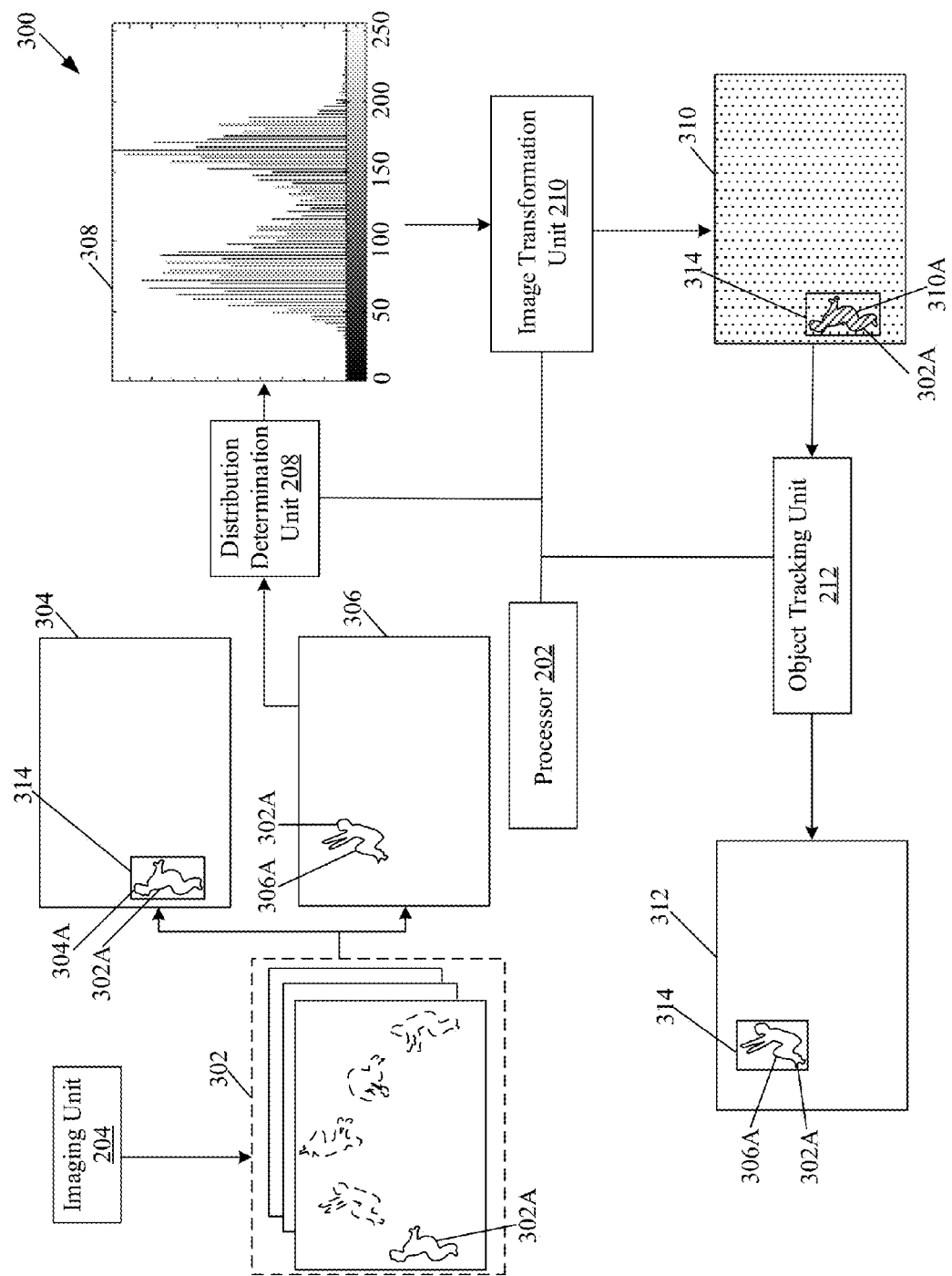
FIG. 3 illustrates an exemplary scenario for deformation insensitive tracking of objects in a sequence of image frames, in accordance with an embodiment of the disclosure.

FIG. 3 illustrates an exemplary scenario for deformation insensitive tracking of objects in a sequence of image frames, in accordance with an embodiment of the disclosure. With reference to FIG. 3, there is shown an exemplary scenario 300 of a scene of a live gymnastics performance. The exemplary scenario 300 is described in conjunction with, for example, FIG. 2.

With reference to the exemplary scenario 300, there is shown a sequence of image frames 302 that may be captured by the imaging unit 204 of the electronic device 102, such as a camcorder. The sequence of image frames 302 may include an object, such as a gymnast 302A, that exhibits a plurality of body forms during the live gymnastics performance. The plurality of body forms of the gymnast 302A may correspond to deformations that may vary with respect to time during the live gymnastics performance.

The sequence of image frames 302 may include at least a current image frame 304 and a next image frame 306. The current image frame 304 may include a first body form 304A and the next image frame 306 may include a second body form 306A. There is further shown a graphical distribution 308, a back projection map of a modified current image frame 310, and a resultant image frame 312. The back projection map of the modified current image frame 310 may include a likelihood gymnast projection 310A of the gymnast 302A. The resultant image frame 312 that corresponds to the next image frame 306 may include a rectangular box 314. The rectangular box 314 corresponds to a tracker for the gymnast 302A in the next image frame 306. There are further shown a plurality of electronic components (in the camcorder) that correspond to the electronic components, described in the block diagram 200 in FIG. 2. The sequence of image frames 302 may correspond to the video content 108, as described in FIG. 1.

With reference to the exemplary scenario 300, the imaging unit 204 may be configured to capture the sequence of image frames 302 of the scene of the live gymnastics performance. The sequence of image frames 302 may comprise at least the current image frame 304 and the next image frame 306 that may further comprise the object, such as the gymnast 302A. In accordance with the exemplary scenario 300, the gymnast 302A in the sequence of image frames 302 may be associated with different body forms with time progression. For example, the current image frame 304 may include the first body form 304A (enclosed in the rectangular box 314, already tracked accurately by the electronic device 102) at a current timestamp, such as "$t_1$". Further, the next image frame 306 may include a second body form 306A (to be tracked by the electronic device 102) at a next timestamp, such as "$t_2$".

In accordance with the exemplary scenario 300, the distribution determination unit 208 in conjunction with the processor 202 may be configured to determine a distribution, such as the graphical distribution 308, of first pixel values of a first image space associated with a first region. The first region may correspond to the gymnast 302A in the current image frame 304 of the sequence of image frames 302. The first pixel values may correspond to raw pixel values of a plurality of pixels in the current image frame 304. The first image space may correspond to RGB color space. The graphical distribution 308 of the first region that corresponds to the gymnast 302A may indicate a corresponding color histogram of the gymnast 302A. The graphical distribution 308 may be determined by the distribution determination unit 208, based on the expressions (1) and (2), described above in FIG. 2.

Based on the graphical distribution 308, the image transformation unit 210 in conjunction with the processor 202 may be configured to transform the current image frame 304 to the back projection map of the modified current image frame 310. The transformation of the current image frame 304 to the back projection map of the modified current image frame 310 may be achieved, based on the expression (3), as described in FIG. 2. The back projection map of the modified current image frame 310 may include at least a second region association with second pixel values in a second image space. The second region may correspond to the first region that corresponds to the gymnast 302A. The second pixel values may correspond to likelihood values of the plurality of pixels in the back projection map of the modified current image frame 310. The second image space may correspond to a likelihood space or a back projection space. The second region may represent the likelihood values of the gymnast 302A and is shown as the likelihood gymnast projection 310A of the gymnast 302A. The second region in the back projection map of the modified current image frame 310 may be associated with one or more features.

The object tracking unit 212 in conjunction with the processor 202 may be further configured to determine a portion in a back projection map of a modified next image frame (not shown) of the next image frame 306. The portion in the back projection map of the modified next image frame of the next image frame 306 may be determined in a manner similar to the above for determination of the second region in the modified current image frame 310.

The object tracking unit 212 in conjunction with the processor 202 may be further configured to determine a similarity score between the second region in the back projection map of the modified current image frame 310 and the portion in the modified next frame. The similarity score may be determined based on the one or more features, extracted as the template, associated with the second region in the back projection map of the modified current image frame 310 and the one or more features associated with the portion in the modified next image frame.

Based on the similarity score, that exceeds a specified second threshold value, the object tracking unit 212 in conjunction with the processor 202 may be configured to identify that the object, i.e. the gymnast 302A, associated with the second region in the back projection map of the modified current image frame 310 is same as the object associated with the portion in the modified next image frame.

The object tracking unit 212 in conjunction with the processor 202 may be further configured to generate a resultant image frame 312 that corresponds to the next image frame 306 and includes the rectangular box 314 that encloses the second body form 306A of the gymnast 302A. Thus, the gymnast 302A is tracked accurately in the next image frame 306 without any drift. The resultant image frame 312 (with the tracked gymnast 302A) may be displayed on the display screen 214A of the camcorder.

Figure 4:
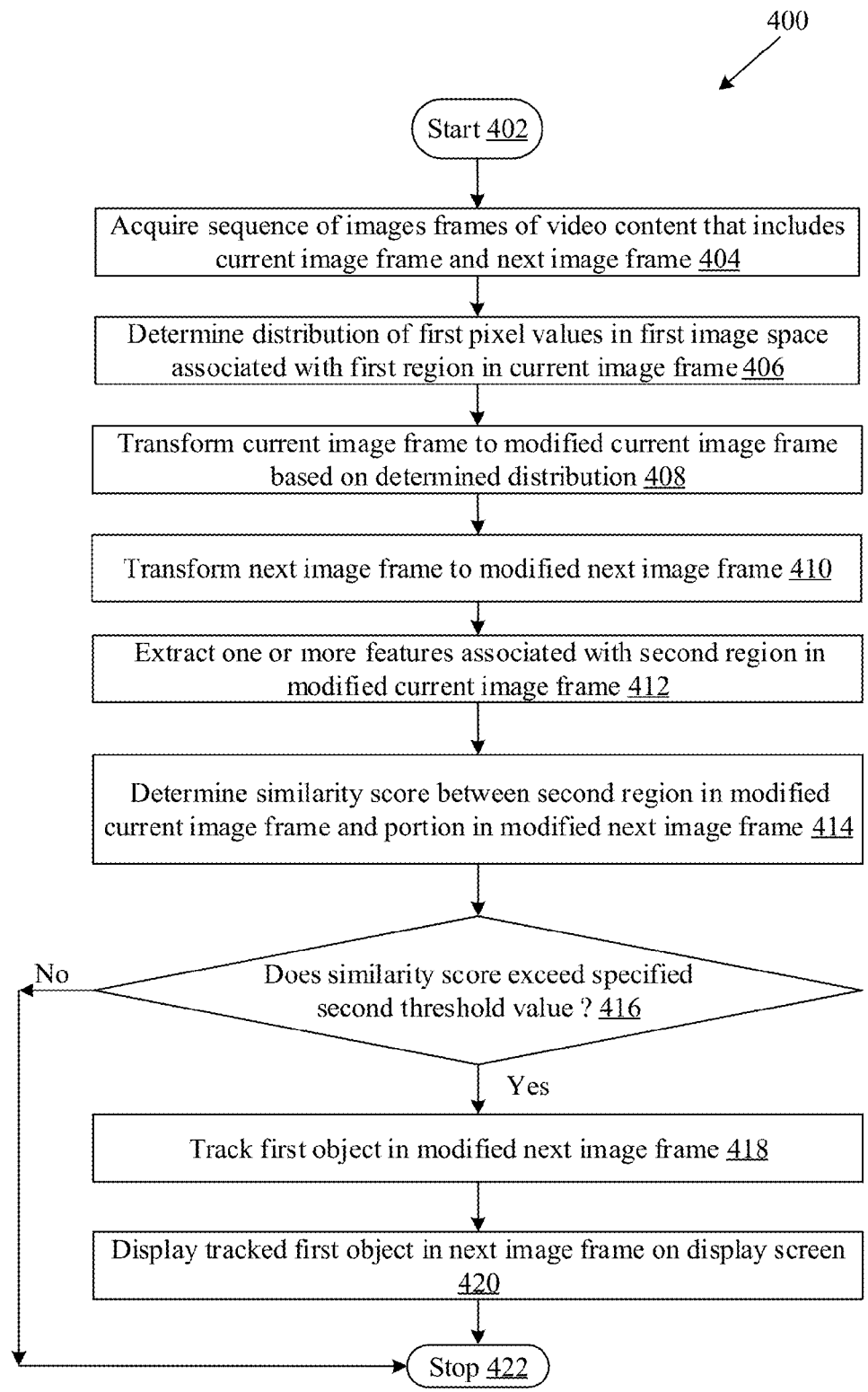
FIG. 4 is a flow chart that illustrates a video processing method for deformation insensitive tracking of objects in a sequence of image frames, in accordance with an embodiment of the disclosure.

FIG. 4 is a flow chart that illustrates a video processing method for deformation insensitive tracking of objects in a sequence of image frames, in accordance with an embodiment of the disclosure. With reference to FIG. 4, there is shown a flowchart 400. The flowchart 400 is described in conjunction with, for example, FIG. 2. The method starts at 402 and proceeds to 404.

At 404, a sequence of image frames of video content that includes a current image frame and a next image frame may be acquired. In accordance with an embodiment, the processor 202 may acquire the sequence of image frames, based on retrieval of video content, such as the video content 108, from the memory unit 206. In accordance with an embodiment, the processor 202 may acquire the sequence of image frames, based on capturing of the video content by the imaging unit 204.

At 406, a distribution of first pixel values in a first image space associated with a first region in the current image frame may be determined. In accordance with an embodiment, the distribution determination unit 208 in conjunction with the processor 202 may be configured to determine the distribution of the first pixels values in the first image space that may be associated with the first region. The distribution may be determined based on the expressions (1) and (2), as described in FIG. 2. The first region may correspond to the first object in the current image frame. The first pixel values may correspond to raw pixel values of a plurality of pixels in the current image frame. In accordance with an embodiment, the first image space may correspond to a color space, such as RGB color space.

At 408, transformation of the current image frame to a modified current image fame may be performed, based on the determined distribution. In accordance with an embodiment, the image transformation unit 210 in conjunction with the processor 202 may be configured to transform the current image frame to the modified current image frame, based on the determined distribution as determined by the distribution determination unit 208. The transformation of the current image frame to the modified current image frame may be based on the expression (3), as described in FIG. 2. The modified current image frame may include at least a second region that may correspond to the first region. Further, the second region may be associated with second pixels values in a second image space. The second pixel values may correspond to likelihood values of the plurality of pixels in the modified current image frame. The second image space may correspond to the likelihood space. The transformation of the current image frame to the modified current image frame may include conversion of raw pixel values of the plurality of pixels in the current image frame to likelihood values of the plurality of pixels in the modified current image frame.

At 410, transformation of the next image frame to a modified next image fame may be performed. Similar to the transformation of the current image frame, the transformation of the next image frame to the modified next image frame may also include conversion of raw pixel values of the plurality of pixels in the next image frame to likelihood values of the plurality of pixels in the modified next image frame. The modified next image frame may include at least a portion that may correspond to the first object.

At 412, one or more features associated with a second region in the modified current image frame may be extracted. In accordance with an embodiment, the object tracking unit 212 in conjunction with the processor 202 may be configured to extract the one or more features associated with the second region in the modified current image frame. The second region may correspond to the first object in the current image frame. The one or more features may be associated with a spatial variance that may exceed a specified first threshold value. The extracted one or more features associated with the second region in the modified current image frame, may be used as a template to track the first object in a subsequently modified image frame, such as the modified next image frame.

At 414, a similarity score between the second region in the modified current image frame and a portion in the modified next image frame may be determined. In accordance with an embodiment, the object tracking unit 212 may be configured to determine the similarity score between the second region in the modified current image frame and the portion in the modified next image frame. The similarity score may be determined based on the one or more features, extracted as the template, associated with the second region in the modified current image frame and one or more features, associated with the portion in the modified next image frame. In accordance with an embodiment, the object tracking unit 212 may be configured to determine the one or more features associated with the portion in the modified next image frame. The object tracking unit 212 may be configured to determine the one or more features associated with the portion in the modified next image frame based on 406 to 412 executed for the current image frame and the next image frame.

At 416, it may be determined whether the similarity score exceeds a specified second threshold value. In accordance with an embodiment, the object tracking unit 212 in conjunction with the processor 202, may be configured to determine whether the similarity score exceeds the specified second threshold value. In an instance, in an event that the similarity score exceeds the specified second threshold value, control passes to 418. In another instance in an event that the similarity score is less than the specified second threshold value, it may be considered that an object associated with the second region in the modified current image frame is different from an object associated with the portion in the modified next image frame. For such an instance, control passes to end 422.

At 418, in an event that the similarity score exceeds the specified second threshold value, the first object may be tracked in the modified next image frame. In accordance with an embodiment, the object tracking unit 212 may be configured to track the first object in the modified next image frame. In such a case, it may be identified that the first object associated with the second region in the modified current image frame is same as the object associated with the portion in the modified next image frame. At 420, the tracked first object may be displayed in the next image frame on a display screen. In accordance with an embodiment, the display screen 214A included in the I/O device 214, in conjunction with the object tracking unit 212 and the processor 202, may be configured to display the tracked first object in the next image frame. Control passes to end 422.

Various embodiments of the disclosure encompass numerous advantages that includes a video processing system and method for object tracking in a sequence of image frames. The video processing system and method, as disclosed herein, overcomes the drift issues associated with tracking of objects (such as the gymnast 302A) associated with one or more deformations (non-rigid deformations), as experienced by a standard template tracking technique. The video processing method further prevents loss of useful information, such as the spatial information of the object, as experienced by a standard histogram tracking technique. Thus, the video processing methods, as described above with regards to the standard techniques, increases overall computational complexity and reduces efficiency of the video processing system.

To overcome the aforesaid problems, the video processing method, as disclosed herein, combines the histogram features of a standard histogram tracking technique and the spatial features of a standard template tracking technique. In other words, the spatially insensitive features of the objects are efficiently extracted by use of the standard histogram tracking technique followed by optimal extraction of the spatially sensitive features of the objects by the standard template tracking technique. Consequently, the video processing method, as disclosed herein, reduces overall computational complexity and increases efficiency of the video processing system for object tracking.

Further, the disclosed video processing system provides an additional robustness to template tracking of objects with respect to one or more deformations. The additional robustness is observed due to the replacement of the raw pixel values (of the plurality of pixels in the current image frame) with the likelihood values (of the plurality of pixels in the modified current image frame as a pre-processing step before template tracking). Such likelihood values are relatively same for the objects to be tracked in the current image frame, thereby enhances the robustness of the video processing system.

The disclosed video processing method and system may be implemented in various application areas, such as video surveillance technique, object recognition technique, and/or the like. For example, the disclosed video processing system may perform background subtraction (or foreground detection) in the current image frame, based on the distribution determined by the distribution determination unit 208. The disclosed video processing method and system may be suited for a real-world tracking application, such as video surveillance of car tracking for autonomous navigation.

In accordance with an embodiment of the disclosure, a video processing system for object tracking in a sequence of image frames is disclosed. The electronic device 102 (FIG. 1) may comprise one or more circuits that may be configured to acquire a sequence of image frame of video content, such as the video content 108 (FIG. 1). The acquired sequence of image frames may comprise at least a current image frame and a next image frame that includes at least one object (such as the first object). The electronic device 102 may comprise one or more circuits, such as the distribution determination unit 208 (FIG. 2), that may be configured to determine a distribution of first pixel values in a first image space associated with a first region. The first region may correspond to the at least one object in the current image frame. The electronic device 102 may comprise one or more circuits, such as the image transformation unit 210 (FIG. 2), that may be configured to transform the current image frame to a modified current image frame based on the determined distribution. The modified current image frame may include at least a second region that may correspond to the first region. The second region may be further associated with second pixel values in a second image space. The electronic device 102 may comprise one or more circuits, such as the object tracking unit 212 (FIG. 2), that may be configured to track the at least one object (such as the first object) in the modified next image frame based on one or more features extracted as a template that may be associated with the second region in the modified current image frame.

Various embodiments of the disclosure may provide a non-transitory computer readable medium and/or storage medium, wherein there is stored thereon, a machine code and/or a computer program with at least one code section executable by a machine and/or a computer to track objects in a sequence of image frames. The at least one code section in the electronic device 102 may cause the machine and/or computer to perform the steps that comprise acquisition of a sequence of image frames of video content, such as the video content 108. The acquired sequence of image frames may comprise at least a current image frame and a next image frame that may include at least one object. The electronic device 102 may be further configured to determine a distribution of first pixel values in a first image space associated with a first region. The first region may correspond to the at least one object in the current image frame. The electronic device 102 may be further configured to transform the current image frame to a modified current image frame based on the determined distribution. The modified current image frame may include at least a second region that may correspond to the first region. The second region may be further associated with second pixel values in a second image space. The electronic device 102 may be further configured to track the at least one object in the modified next image frame based on one or more features extracted as a template associated with the second region in the modified current image frame.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that falls within the scope of the appended claims.

What is claimed is:

1. A video processing system, comprising:
    circuitry in an electronic device configured to:
        acquire a sequence of image frames of video content, wherein said sequence of image frames comprise at least a current image frame and a next image frame, and wherein each of said current image frame and said next image frame comprises at least one object;
        determine a distribution of a plurality of first pixel values in a first image space associated with a first region, wherein said first region corresponds to said at least one object in said current image frame;
        transform said current image frame to a modified current image frame based on said distribution, wherein said modified current image frame includes at least a second region that corresponds to said first region, and
        wherein said second region is associated with a plurality of second pixel values in a second image space;
        determine a similarity score between said second region in said modified current image frame and a portion in a modified next image frame based on at least one feature of said second region in said modified current image frame,
    wherein said modified next image frame is obtained based on said next image frame; and
        track said at least one object in said modified next image frame based on said similarity score that exceeds a first threshold value.

2. The video processing system according to claim 1, wherein said at least one object in each of said current image frame and said next image frame is associated with at least one deformation.

3. The video processing system according to claim 1,
    wherein said plurality of first pixel values correspond to a plurality of raw pixel values of a plurality of pixels in said current image frame, and
    wherein said plurality of second pixel values correspond to a plurality of likelihood values of said plurality of pixels in said modified current image frame.

4. The video processing system according to claim 1,
    wherein said first image space corresponds to a color space, and
    wherein said second image space corresponds to a likelihood space.

5. The video processing system according to claim 1, wherein said circuitry is further configured to transform said current image frame to said modified current image frame based on a conversion of a plurality of raw pixel values of a plurality of pixels in said current image frame to a plurality of likelihood values of said plurality of pixels in said modified current image frame.

6. The video processing system according to claim 1, wherein said distribution corresponds to a color histogram of said first region.

7. The video processing system according to claim 1, wherein said at least one feature is associated with a spatial variance parameter that exceeds a second threshold value.

8. The video processing system according to claim 1, wherein said circuitry is further configured to extract said at least one feature of said second region as a template.

9. A video processing method, comprising:
    in an electronic device comprising circuitry:
        acquiring a sequence of image frames of video content, wherein said sequence of image frames comprise at least a current image frame and a next image frame, and wherein each of said current image frame and said next image frame comprises at least one object;

determining a distribution of a plurality of first pixel values in a first image space associated with a first region, wherein said first region corresponds to said at least one object in said current image frame;

transforming said current image frame to a modified current image frame based on said distribution, wherein said modified current image frame includes at least a second region that corresponds to said first region, and wherein said second region is associated with a plurality of second pixel values in a second image space;

determining a similarity score between said second region in said modified current image frame and a portion in a modified next image frame based on at least one feature of said second region in said modified current image frame, wherein said modified next image frame is obtained based on said next image frame; and tracking said at least one object in said modified next image frame based said similarity score that exceeds a first threshold value.

10. The video processing method according to claim 9, wherein said at least one object in each of said current image frame and said next image frame is associated with at least one deformation.

11. The video processing method according to claim 9, wherein said plurality of first pixel values correspond to a plurality of raw pixel values of a plurality of pixels in said current image frame, and wherein said plurality of second pixel values correspond to a plurality of likelihood values of said plurality of pixels in said modified current image frame.

12. The video processing method according to claim 9, wherein said first image space corresponds to a color space, and wherein said second image space corresponds to a likelihood space.

13. The video processing method according to claim 9, wherein said transformation of said current image frame to said modified current image frame is based on a conversion of a plurality of raw pixel values of a plurality of pixels in said current image frame to a plurality of likelihood values of said plurality of pixels in said modified current image frame.

14. The video processing method according to claim 9, wherein said distribution corresponds to a color histogram of said first region.

15. The video processing method according to claim 9, wherein said at least one feature is associated with a spatial variance parameter that exceeds a second threshold value.

16. The video processing method according to claim 9, further comprising extracting said at least one feature of said second region as a template.

17. A non-transitory computer-readable storage medium having stored thereon, a set of computer executable instructions, which when executed by a computer, cause said computer to execute operations, said operations comprising:

acquiring a sequence of image frames of video content, wherein said sequence of image frames comprise at least a current image frame and a next image frame, and wherein each of said current image frame and said next image frame comprises at least one object;

determining a distribution of a plurality of first pixel values in a first image space associated with a first region, wherein said first region corresponds to said at least one object in said current image frame;

transforming said current image frame to a modified current image frame based on said distribution, wherein said modified current image frame includes at least a second region that corresponds to said first region, and wherein said second region is associated with a plurality of second pixel values in a second image space;

determining a similarity score between said second region in said modified current image frame and a portion in a modified next image frame based on at least one feature of said second region in said modified current image frame, wherein said modified next image frame is obtained based on said next image frame; and tracking said at least one object in said modified next image frame based on said similarity score that exceeds a threshold value.

18. A video processing system, comprising:
circuitry configured to:
acquire a sequence of image frames of video content, wherein said sequence of image frames comprise at least a current image frame and a next image frame, and wherein each of said current image frame and said next image frame comprises at least one object;

determine a distribution of a plurality of first pixel values in a first image space associated with a first region, wherein said first region corresponds to said at least one object in said current image frame;

transform said current image frame to a modified current image frame based on said distribution, wherein said modified current image frame includes at least a second region that corresponds to said first region, and wherein said second region is associated with a plurality of second pixel values in a second image space; and track said at least one object in a modified next image frame based on one or more features extracted as a template associated with said second region in said modified current image frame, wherein said one or more features are associated with a spatial variance parameter that exceeds a specified threshold value.

* * * * *